Patented June 23, 1936

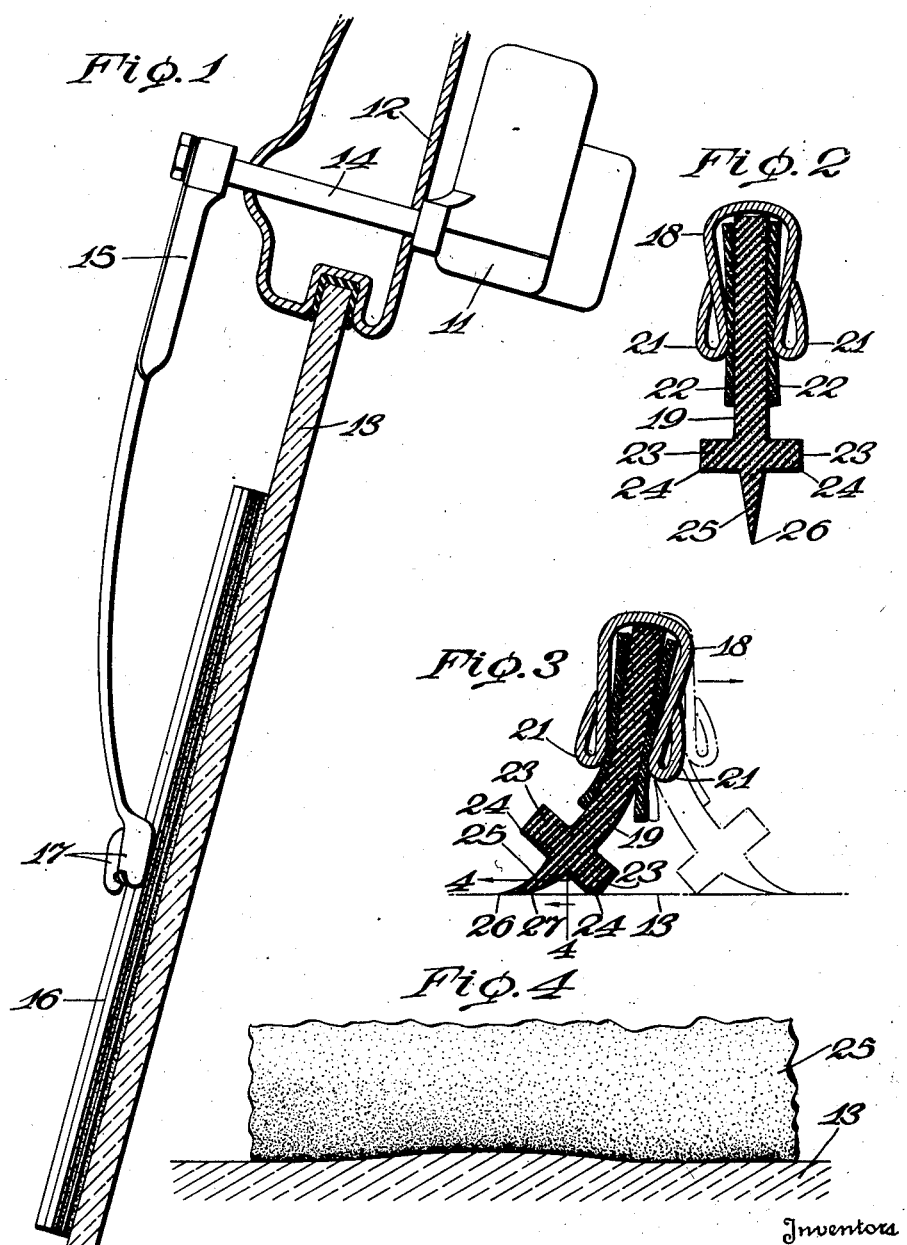

2,045,141

UNITED STATES PATENT OFFICE 2,045,141

WINDSHIELD WIPER BLADE

Erwin C. Horton, Hamburg, and Henry Hueber, Buffalo, N. Y., assignors to Trico Products Corporation, Buffalo, N. Y.

Application May 29, 1933, Serial No. 673,553

1 Claim. (Cl. 15—245)

This invention relates to windshield wiper blades and particularly to an improved formation of the portions thereof which contact the surface to be wiped, whereby an improved wiping action results.

Windshield wiper blades normally comprise one or more plies of rubber composition and are moved across the glass surface with one or more edges in contact with the glass, to wipe away water, snow, or other forms of moisture or foreign matter. To secure proper wiping action, the blade is pressed against the glass with considerable pressure, in order that the wiping edge or edges will contact the glass along the entire length of the blade. Consequently the blade must be of a comparatively thick strip or plies or be of comparatively stiff rubber composition, to prevent it from being so bent that a flat side surface, rather than an edge surface, is presented to the glass.

In use such blades frequently leave streaks across the wiped glass surface because the wiping edge or edges, being comparatively stiff, do not follow closely or conform to minute irregularities in the glass surface, or because the blades have somewhat irregular edges and do not possess sufficient flexibility to permit complete conformation to the glass surface. If it is attempted to overcome this difficulty by making the blade of an extremely thin strip or plies or of rubber composition which is extremely flexible, the necessary pressure will completely deform the blade, so that side surfaces, and not edge portions, of the blade will contact the glass.

The present invention contemplates a wiper blade having a body portion of relatively heavy rubber composition, or the like, with one or more relatively heavy primary wiping edges, and having a very thin and flexible, preferably tapering edge portion for trailing the primary wiping portions to smooth out any moisture remaining on the wiped surface and thereby eliminating streaks. The trailing edge portion, being very thin, and hence very flexible, will conform accurately to the glass surface whether it be even or somewhat irregular, while the heavy wiping edge portions will lend the necessary structural stiffness to the blade and will perform most of the wiping work.

These and other objects and advantages of the invention will become apparent from the following description of the typical embodiment of the invention illustrated in the accompanying drawing wherein:

Fig. 1 is a vertical section through the windshield and header construction of a motor vehicle provided with a windshield cleaner including the wiper blade of the present invention;

Fig. 2 is a cross-section through the wiper blade;

Fig. 3 is a view similar to Fig. 2 but showing the position of the blade when in operation upon a glass surface; and Fig. 4 is a fragmentary view taken along line 4—4 of Fig. 3.

As shown in Fig. 1, the windshield cleaner comprises a motor 11 supported by the header structure 12 of the vehicle body above the windshield glass 13. The motor oscillates, or partially rotates, a shaft 14 which carries the arm 15 to which blade 16 is connected by means 17. The connecting means 17 preferably provide a play connection between the blade and arm so that, upon movement of the arm in either direction about the axis of shaft 14, the blade may be slightly inclined relative to the glass surface, i. e., will assume a position substantially as shown in full lines in Fig. 3 when moving in the direction of the arrow and will assume the broken line position of Fig. 3 when moved in the opposite direction. Any suitable spring means, as for example the resilient arm 15, may be incorporated in the arm and shaft assembly to press the blade against the glass so that the latter will be contacted and wiped by the entire longitudinal edge portion of the wiper.

The blade, as best illustrated in Figs. 2 and 3, includes a metal holder 18 which may be of a channel or U-cross-section, for receiving a body 19 of rubber or like composition. The edges 21, 21 of the holder may be contracted to retain the body 19, and are preferably return bent as indicated, in order to obviate raw metallic edges in contact with the composition body, which otherwise might unduly wear or cut the latter. As a further preventive of such condition, strips 22 of tough rubber, or like abrasion-resistant material, may be inserted between body 19 and edges 21, 21 of the holder 18.

On the wiping edge of body 19 is formed integrally a pair of relatively heavy oppositely extending shoulders 23, 23, providing a wiping edge 24 on each side of the blade, each edge 24 being backed by a considerable mass of rubber composition and therefore being resistant to flexure to a comparatively great degree. Between the edges 24, 24 and integral with body 19, is a relatively thin fin 25. The fin preferably tapers from a widest point adjacent the shoulders 23, 23 to a thin, almost knife-like edge 26, and because of its thin formation is much more susceptible of flexure than the shouldered portions 23, 23.

In operation, as indicated in Fig. 3, the body 19 between shoulders 23, 23 and holder 18 will be somewhat flexed due to the pressure of the blade toward the surface of glass 13, the movement of the blade (in the direction of the arrow) over the glass, and the resulting frictional resistance due to the contact of one shoulder 23 and fin 25 with the glass. During such operation, the shoulder 23, or wiping edge 24, will function in the usual manner to remove water or snow from the glass. However, because of the thickness of the shoulder 23 and the adjacent body portion 19, the edge 24 will be unable to exactly conform to the irregular surface of the glass (which is apparent in the magnified view Fig. 4), or to flex sufficiently to bring its own edge line, which may be irregular, into full contact with a glass surface if the latter be smooth. For either or both of these reasons, the area of glass, between contacting edge 24 (Fig. 3) and point 27 on the glass where the fin 25 contacts, may be streaked by small quantities of water or snow or other matter passed over by the edge 24.

Fin 25, especially the very thin portion thereof adjacent edge 26, being very flexible, will conform almost exactly to the surface of the glass, whether the latter be smooth or irregular, and will wipe away much of the water or other matter on the glass which edge 24 has passed over. In this action the fin 25, and particularly the edge portion thereof, will have considerable flexure relative to the shouldered portions 23, 23 of the body 19. Further, the fin 25, by presenting a comparatively large area to the glass, will tend to smooth out or spread any remaining water, so that a film, or comparatively wide strips of film, of water will remain on the glass, rather than the more numerous very narrow streaks which impair transparency of the glass.

It will be understood that upon reversal of movement of the blade, the other wiping edge 24 will contact the glass so that the blade will operate in the same manner upon the return stroke, it then assuming the alternate reversed position shown in broken lines in Fig. 3.

Further, it will be understood that the device herein shown and described is merely illustrative of the inventive principles involved, which may be applied within the purview of this invention, to wiper blades having other structural or physical formations.

What is claimed is:

In a wiper blade, a body of rubber composition, or of like material, having integral and substantially self-sustaining wiping shoulders formed on the opposite sides thereof to provide opposed wiping edges for alternate engagement with a surface to be wiped, and a relatively thin integral fin projecting from the body between said opposed wiping shoulders and feathering to a flaccid lapping edge portion lacking self-sustaining characteristics and possessing greater flexibility than said shoulders for lapping the surface wiped by such shoulders.

ERWIN C. HORTON.
HENRY HUEBER.